United States Patent
Flannery

(10) Patent No.: US 6,594,405 B1
(45) Date of Patent: Jul. 15, 2003

(54) METHOD AND APPARATUS FOR PREPRINTED FORMS COMPLETION

(75) Inventor: Michael R. Flannery, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/221,453

(22) Filed: Dec. 28, 1998

(51) Int. Cl.⁷ ............... G06K 9/60; H04N 1/00; H04N 9/74; G06T 1/60; G06F 15/00
(52) U.S. Cl. ............ 382/302; 382/307; 382/305; 358/450; 358/403; 345/640; 345/629; 348/589; 348/586; 707/507; 707/505
(58) Field of Search ............ 382/321, 317, 382/305, 306, 175, 180, 206; 358/403, 404, 402, 452, 450; 348/207; 345/734, 738, 700, 760; 707/506, 507, 542

(56) References Cited

U.S. PATENT DOCUMENTS

| | | | |
|---|---|---|---|
| 5,050,101 A | 9/1991 | Kiuchi et al. | 364/519 |
| 5,215,396 A | 6/1993 | Rogers | 400/718 |
| 5,228,100 A | 7/1993 | Takeda et al. | 382/61 |
| 5,231,579 A | 7/1993 | Tsuchiya et al. | 364/419 |
| 5,251,273 A | 10/1993 | Betts et al. | 382/57 |
| 5,290,109 A * | 3/1994 | Midorikawa | 400/68 |
| 5,330,275 A * | 7/1994 | Hasewinle | 400/82 |
| 5,428,694 A | 6/1995 | Betts et al. | 382/317 |
| 5,455,565 A | 10/1995 | Moeenziai et al. | 340/603 |
| 5,459,796 A | 10/1995 | Boyer | 382/187 |
| 5,477,037 A * | 12/1995 | Berger | 235/379 |
| 5,544,045 A * | 8/1996 | Garland et al. | 364/419.03 |
| 5,687,300 A * | 11/1997 | Cooper | 395/109 |
| 5,748,780 A * | 5/1998 | Stolfo | 382/232 |
| 5,987,231 A * | 11/1999 | Fong et al. | 395/117 |
| 6,026,187 A * | 2/2000 | Siegel | 382/213 |

* cited by examiner

Primary Examiner—Bhavesh Mehta
Assistant Examiner—Yosef Kassa
(74) Attorney, Agent, or Firm—Scott Charles Richardson; Bradley A. Forrest; Schwegman, Lundberg, Woessner & Kluth

(57) ABSTRACT

A method and apparatus that provides for the straightforward completion of preprinted forms with a word processor, or with another computer program suitable for generating text, is disclosed. The method and apparatus provide for the display of a scaled image of the form so that a user can accurately position text or other data for printing in the fields of the form. An image of the preprinted form is provided to a document having a background and a foreground. The image is displayed in the background Data is entered into the foreground. The data in the foreground is printed onto the preprinted form. The form can be scanned to create the image. The form is then provided to a printer. The image is provided to a word processing document as the background. The data is entered into the foreground with the word processor.

21 Claims, 4 Drawing Sheets

METHOD AND APPARATUS FOR PREPRINTED FORMS COMPLETION

BACKGROUND

The present invention relates to a document processing system. Specifically, the present invention relates to an apparatus and method for producing documents with a word processing application for printing on a preprinted form.

The personal computer in many ways has made the typewriter obsolete. The personal computer, operating standard word processing software, offers flexibility, error correction capability and ease of use never possible with the typewriter. A user of a word processor is able to create professional-looking, error free documents. The user of a typewriter was often limited as to choices and troubled by any mistakes.

However, one area where a typewriter is preferred over a word processor is in the completion of preprinted blank forms. Typewriters are unable to effectively correct mistakes, change fonts with relative ease, or store the information provided to the fields of the forms. The typewriter is the lesser of two evils, however, sc. the word processor is unable to efficiently and accurately position the generated text into the proper fields of a preprinted form. In order to effectively use the word processor to complete forms, the user must know in advance the relative position of each of the fields of form. The process of determining the relative position of the fields is time consuming. Alternatively, the user may attempt to determine the relative position of the fields through trial and error. The user must input text in the word processing document, then determine the correct position for the text through printing successive iterations of the text and adjusting the position of the text. Accordingly, the process of determining the relative positions of the fields of a blank preprinted form in order to use a word processor to complete the form is an inconvenience to the user. Moreover, the benefits of a word processor are not realized in the completion of forms.

SUMMARY OF THE INVENTION

The present invention is directed to a method and apparatus that provides for the straight-forward completion of preprinted forms with a word processor, or with another computer program suitable for generating text. More particularly, the present invention provides for the display of a scaled image of the form so that a user can accurately position text or other data for printing in the fields of the form.

One aspect of the invention is a method for printing data on preprinted forms. An image of the preprinted form is provided to a document having a background and a foreground. The image is displayed in the background. Data is entered into the foreground. The data in the foreground is printed onto the preprinted form. In this aspect, the form can be scanned and an image created. The form is then provided to a printer. The image is provided to a word processing document as the background. The data is entered into the foreground with the word processing application.

Another aspect of the invention is a computer-readable medium having computer-executable components stored on the computer-readable medium. The components can be executed on a suitably equipped computerized system. An example is a computer program stored on a floppy disc or CD-ROM. The components include an image input component, a user interface component, and an output component. The image input component generates an image of a preprinted form as a background of a document. The user interface component generates user inputs as a foreground of the document. The output component transmits the foreground separately from the background to a printer.

Still, another aspect of the invention is a system comprising an input component, a processor, and an output component. The input component provides an image of a preprinted form. The processor creates a document having a background and a foreground. The processor receives the image and displays the image in the background according to a scale. The processor also receives user inputs and displays the user inputs in the foreground. The output component outputs the foreground onto the preprinted form wherein the processor displays the foreground generally in relation to the scale of the background.

The present invention includes many advantages. Among these is that a user is efficiently and accurately able to complete the fields of a blank form with a word processor, or similar computer program. The user is able to complete forms with a single print job, not several printing iterations. The relative position of the fields of the form are accurately displayed so that the user is aware of the location of text, with respect to the fields, as the text is input into the word processing application. Additionally, the user is able to store the image of the form for retrieval at another date. This enables the user to intermittently complete several forms without having to set up the document with a scanner each time a form is to be developed. Also, the user can store an image of the form together with the text so as to provide an electronic version of the completed form.

The present invention describes computers, computer-readable media and methods of varying scope. Still other and further aspects, advantages and embodiments will be described in the detailed description of the preferred embodiments with reference to the accompanying drawings.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
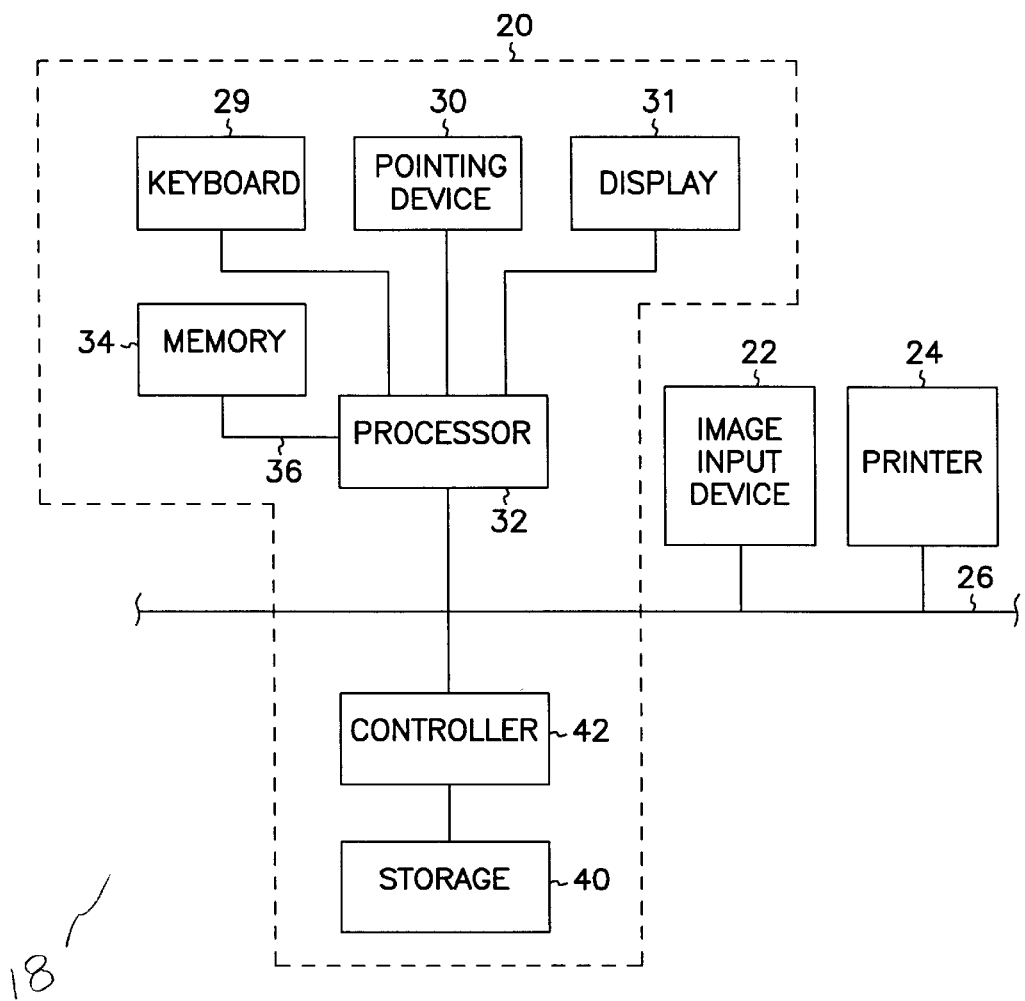
FIG. 1 is a schematic view of the system context of an embodiment of the present invention.

With reference to FIG. 1, an exemplary system 18 for implementing the present invention includes a general purpose computing device in the form of a conventional personal computer 20, an image input device 22 such as a scanner, or the like, and a printer 24 connected together via an interface 26. The personal computer is suitable for executing electronic instructions on a computer readable medium such as piece of software stored on an article, such as a disk or a semiconductor memory, or on a network, such as a private network or the Internet The personal computer 20 includes a keyboard 29, pointing device 30, and display 31 for use by an operator to supply commands to the system 18. The keyboard 29, pointing device 30, and display 31 are connected to a processor 32. A memory 34 is connected to the processor 32 via a memory bus 36. The memory 34 stores data and programs used by the processor 32. The computer 20 also includes a storage unit 40 such as a disc drive operated by a controller 42, or alternatively, a flash memory device. The storage unit 40 provides nonvolatile storage of computer readable instructions, data structures, program modules, and other data for the personal computer 20.

A number of variations to the above described system are contemplated. The image input function and printing function are often performed by separate devices. Those skilled in the art, however, recognize that scanning, copying, printing and faxing features can be provided by a single device. One such product is the HP OfficeJet Model 350 manufactured by Hewlett-Packard of Palo Alto, Calif. Also, the personal computer can be in a networked environment using connections to one or more remote computers, storage devices, or other peripherals such as printers and scanners. It will be appreciated that the connections shown are exemplary and other communication links between the devices may be employed.

Figure 2:
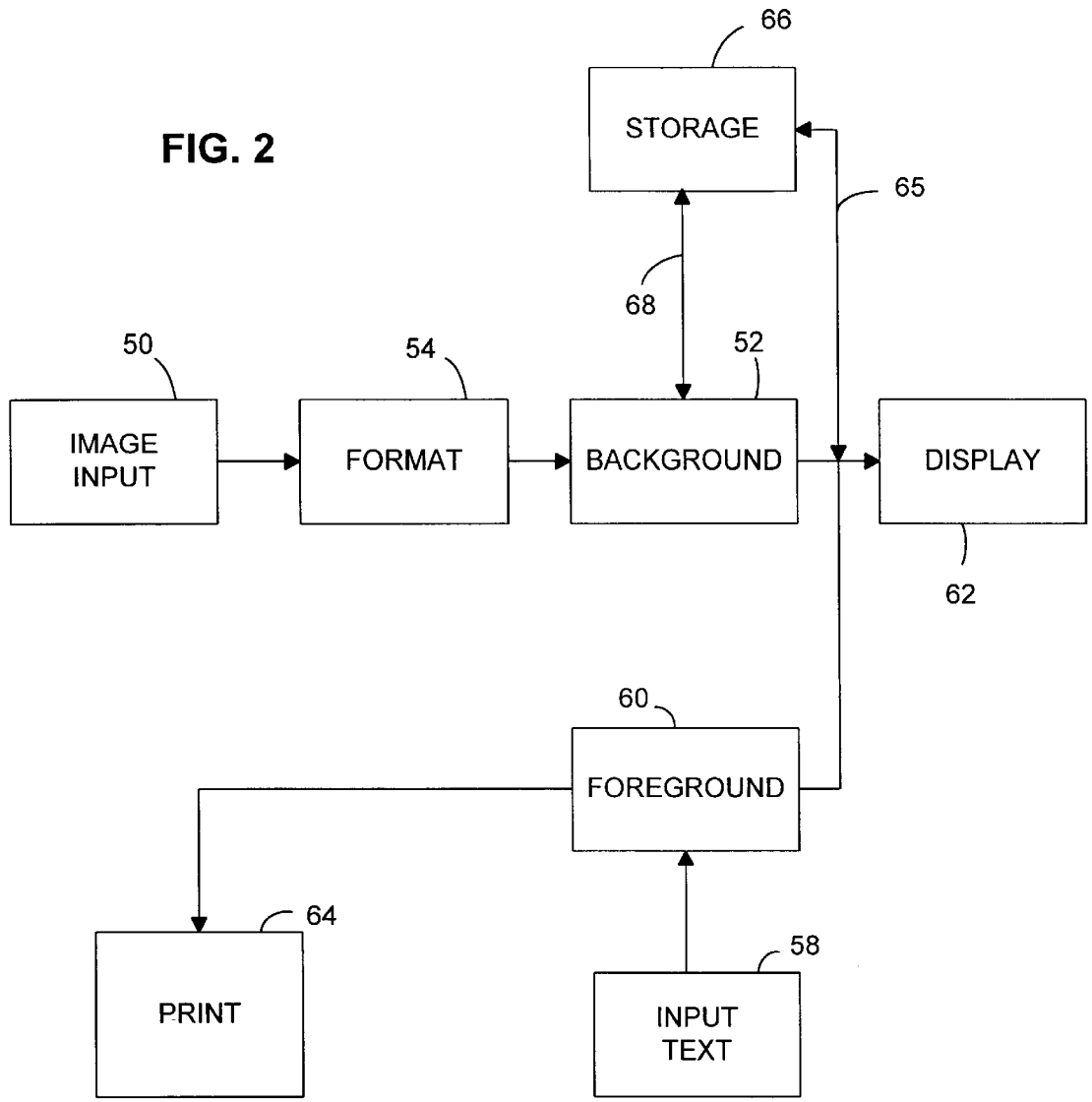
FIG. 2 is a functional block diagram of the embodiment of present invention suitable for implementation in the system shown in FIG. 1.

FIG. 2 shows a functional block diagram of a version of the present invention. The described version of the present invention includes a word processing application which is capable of printing the foreground without the background. An image of a preprinted form is created by the scanner and is input into the computer 50. The image of the form is provided to the background of a document created by the word processing application 52. In one embodiment, the image is formatted 54 prior to being provided to the background. The operator enters data, such as text or other information 58, with the keyboard or pointing device into the foreground of the document 60. The foreground and the background of the document are output to the display 62 to indicate the relative position of the text or other operator provided information with respect to the image of the preprinted form. The information in the foreground can be printed on the preprinted form 64. The entire document 65, including the background and the foreground can be stored in nonvolatile memory 66, or the image of the form can be stored in memory for use as the background in subsequent documents, as indicated at 68.

Figure 3:
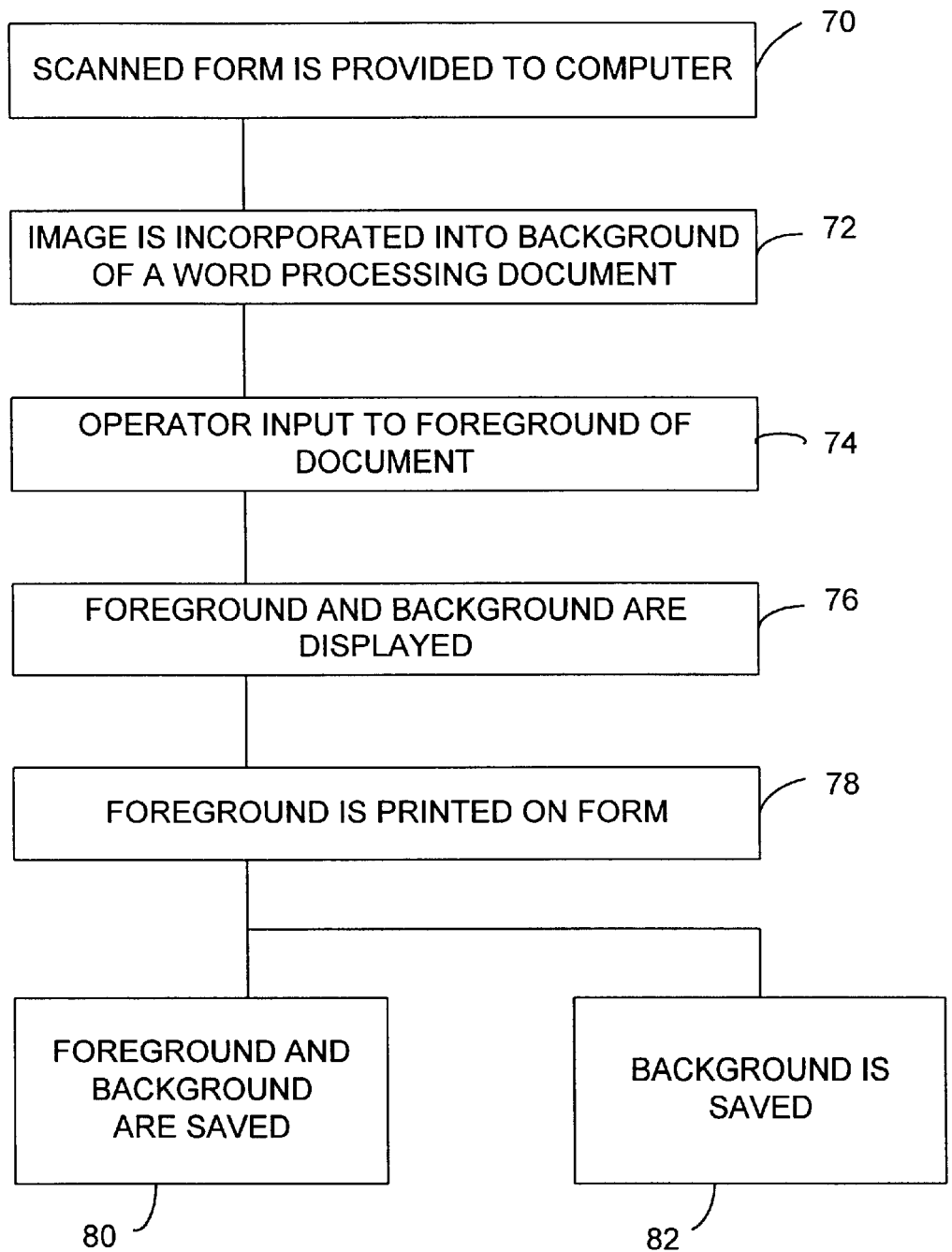
FIG. 3 is a flow diagram of an embodiment of the present invention.

FIG. 3 shows a flow diagram of an overview of the major steps of an embodiment of the present invention. The preprinted form is scanned and its resulting image is provided to a computer 70. The image is incorporated into the background of a word processing application 72 which displays the background prior to user input of information. The operator inputs information into the foreground of the application 74. The foreground and the background are displayed so that the operator can select the locations of the input text as the form is prepared 76. Once the form is prepared, and the user is satisfied with the document, the foreground is printed onto the preprinted form 78 without printing the background. The operator can save the prepared form document 80, i.e., the background and foreground, or the user can save only the blank form 82, i.e., the background, in the nonvolatile memory for retrieval at some other time.

Figure 4:
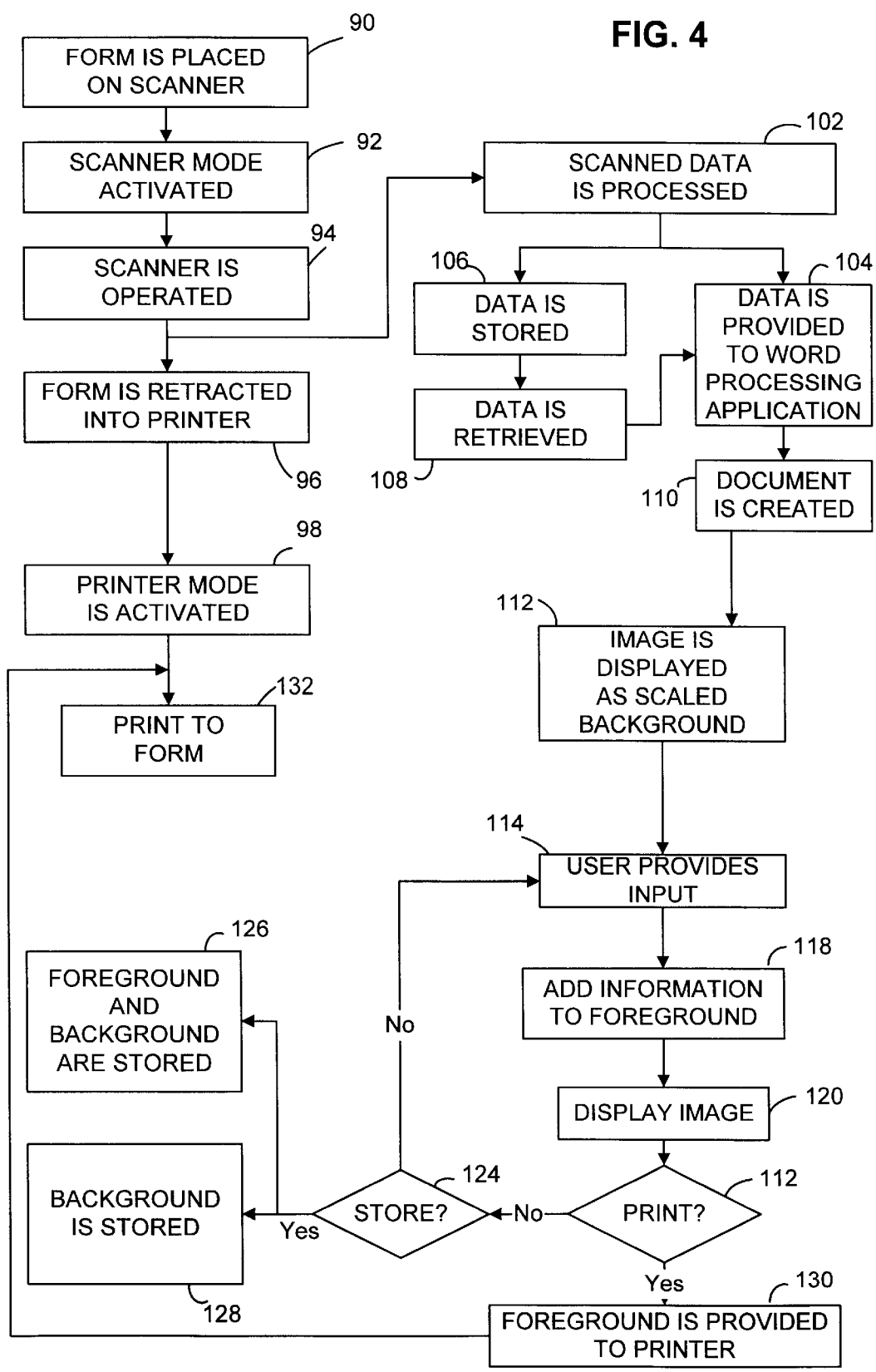
FIG. 4 is another flow diagram of the embodiment of the present invention shown in FIG. 3.

FIG. 4 shows a more detailed flow diagram of the version of the present invention shown in FIG. 3. In order to create the image of the preprinted form, the preprinted form is positioned on the scanner 90, and the scanner mode of the input device is activated 92. The scanner is operated until the entire preprinted form is read 94. In systems where the scanning and printing functions are provided with the same device, the preprinted form is subsequently retracted into the printer position 96 and the printer mode is activated 98. In systems where separate devices are used for scanning and printing, the operator removes the preprinted form from the scanner and places it in the printer. Care should be taken to properly align the form in the scanner. The printer mode, or the printer, remains idle until the operator is ready to print to the preprinted form.

The information provided by the scanner to the computer 102 can be separated into the image and parameters of the image. The image itself can be provided in bit-mapped form, vector form, or otherwise, in a manner known to those skilled in the art. The parameters of the image can include information such as paper size, number of pages in the form, or whether the preprinted form is single side or double sided. The data can be directly provided to a word processing application 104. Alternately, the data can be stored 106 for retrieval at a later time 108. The same data can be provided to the word processing application when the image is retrieved from storage as when the image is provided directly from the scanner.

The word processing application creates a document with the data 110. Initially, the image, as dictated by the parameters, is displayed as a scaled background of the document 112. The word processing application is ready to receive user inputs 114. If the user provides data, or textual information such as filling in the fields of the form, this data is added to a foreground of the document 118. The foreground is displayed relative to the background so that the user is able manipulate text so as to properly position the text within the fields of the form 120. Such manipulations include the use of different font sizes and line spaces to properly position text in corresponding areas of the form displayed in the background.

The user is able to print 122 or store 124 the document (or print and store, not shown). The user can save the prepared form document 126, i.e., the background and foreground, or the user can save only the blank form 128, i.e., the background, in the nonvolatile memory for retrieval at some other time. When the user wishes to print, the foreground is provided to the printer 130. Accordingly, the printer prints the foreground on the blank form 132.

Although the present invention has been described with reference to preferred embodiments, workers skilled in the art will recognize that changes may be made in form and detail without departing from the spirit and scope of the invention. For example, rather using a word processor, the foreground can be created with a common draw program where a user is able to input text.

What is claimed is:

1. A method for printing data on a preprinted form, the method comprising the steps of:

providing an image of the preprinted form to a document in a word processing application having a background and a foreground;

displaying the image in the background;

entering the data into the foreground independent form the background; and printing the data in the foreground onto the preprinted form.

2. The method of claim 1 wherein the step of providing the image includes the steps of:

scanning the preprinted form to produce the image; and creating the document with a word processing application.

3. The method of claim 2 wherein the step of scanning the preprinted form includes the steps of:

providing the preprinted form to an apparatus operable as a scanner and a printer, the apparatus operably connected to the word processing application;

operating the apparatus as a scanner;

scanning the preprinted form with the scanner;

operating the apparatus as a printer; and providing the preprinted form to the printer.

4. The method of claim 2, and further comprising the step of one of storing the image and storing the foreground and background.

5. The method of claim 1 wherein the step of providing an image includes the step of retrieving the image from a storage.

6. A method for printing data on a preprinted form, the method comprising the steps of:

scanning a preprinted form to create an image;

generating the image in a background;

creating a word processing document including the image; independent from the background;

entering data into the document; and printing the data onto the preprinted form.

7. The method of claim 6 and further comprising the step of one of storing the image and storing a foreground and the background.

8. The method of claim 7 wherein the step of creating a word processing document includes the step of retrieving the image.

9. A program storage medium readable by an information handling system, the program storage medium embodying a program of instructions executable by the information handling system to perform a method for printing data on a preprinted form, the method comprising:

receiving an image of the preprinted form;

creating a foreground and a background; in a word processing application;

including the image in the background;

accepting the data into the foreground; independent from the background; and providing the foreground for printing.

10. A computer-readable medium having computer-executable components stored thereon for execution on a suitably equipped computerized system, the components including:

an image input component for receiving an image of a preprinted form as a background of a document; in a word processing program;

a user interface component for generating a foreground of the document independent from the background in response to a user input; and an output component for transmitting the foreground separately from the background.

11. The computer-readable medium of claim 10 wherein the image input component includes a component for causing a scanning of the preprinted form to create the image.

12. The computer-readable medium of claim 10 wherein the image input component includes a component for retrieval of data from a storage.

13. A system, comprising:

an input component for providing an image of a preprinted form;

a computer including a processor executing a word processing application; for creating a background and a foreground of an electronic document, wherein the processor receives the image and displays the image in the background of the electronic document, independent from the background; the processor also receiving user inputs and displaying the user inputs in the foreground of the electronic document; and an output component for outputting the foreground to a printer;

wherein the processor displays the foreground generally in relation to the scale of the background.

14. The system of claim 13 wherein the input component includes at least one of a scanner and a memory.

15. The system of claim 13 wherein the processor operates a word processing application.

16. The system of claim 13, and further comprising a storage component for storing at least the background.

17. A method for printing data on a preprinted form, the method comprising the steps of:

scanning a preprinted form to create data representative of the preprinted form;

providing the data to a word processing application;

creating a document using the word processing application, and using the data as a background of the document;

displaying the preprinted form in the background;

receiving user input;

entering the user input into a foreground of the document independently of the background; and printing the user input in the foreground onto the preprinted form.

18. The method of claim 17 and further comprising storing the preprinted form data for future use.

19. The method of claim 17 and further comprising storing the user input for future use.

20. A method for printing data, the method comprising the steps of:

scanning a preprinted form to create data representative of the preprinted form;

providing the data to a word processing application;

creating a document using the word processing application, and using the data as a background of the document;

displaying the preprinted form in the background;

receiving user input;

entering the user input into a foreground of the document independently of the background; and printing the user input in the foreground and the data in the background.

21. A program storage medium readable by an information handling system, the program storage medium embodying a program of instructions executable by the information handling system to perform a method for printing data on a preprinted form, the method comprising:

scanning a preprinted form to create data representative of the preprinted form;

providing the data to a word processing application;

creating a document using the word processing application, and using the data as a background of the document;

displaying the preprinted form in the background;

receiving user input;

entering the user input into a foreground of the document independently of the background; and printing the user input in the foreground onto the preprinted form.

* * * * *